Nov. 25, 1969  R. G. BAUMGARTNER  3,480,721
PEDESTAL CLOSURE FOR BURIED TELEPHONE CABLE
Filed Oct. 17, 1968  2 Sheets-Sheet 1
FIG. 5
FIG. 1
FIG. 3
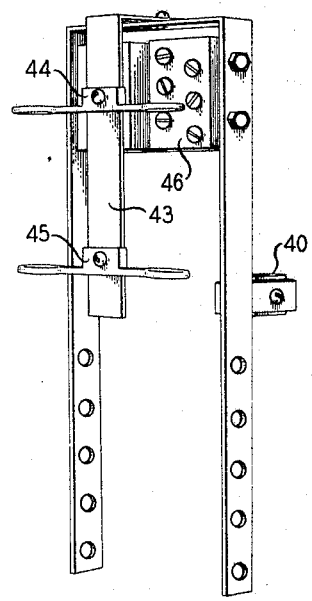
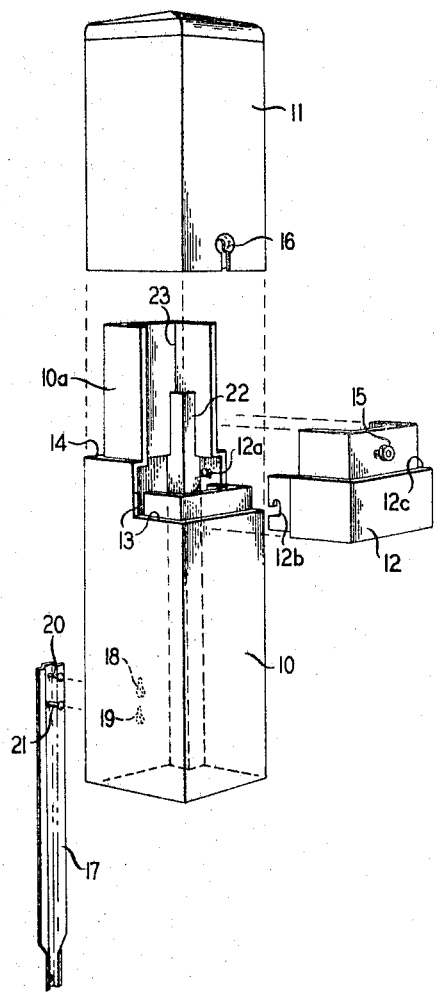
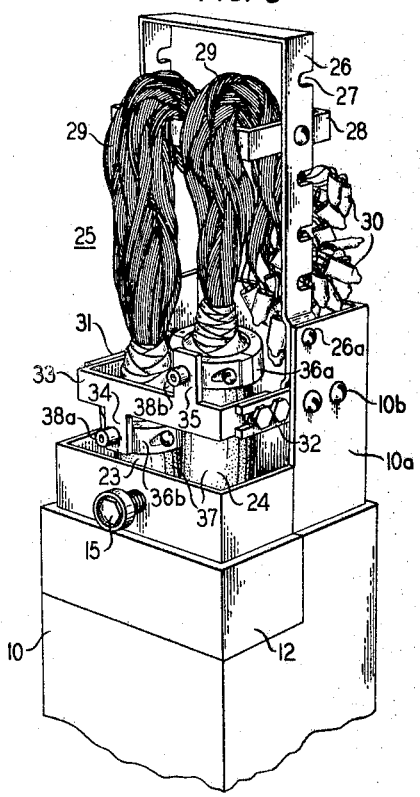
INVENTOR
R G. BAUMGARTNER
BY Charles E. Graves
ATTORNEY Nov. 25, 1969    R. G. BAUMGARTNER    3,480,721
PEDESTAL CLOSURE FOR BURIED TELEPHONE CABLE
Filed Oct. 17, 1968    2 Sheets-Sheet 2

# United States Patent Office 3,480,721
Patented Nov. 25, 1969

3,480,721
PEDESTAL CLOSURE FOR BURIED TELEPHONE CABLE
Robert G. Baumgartner, Baltimore, Md., assignor to Bell Telephone Laboratories, Incorporated, Murray Hill and Berkeley Heights, N.J., a corporation of New York
Filed Oct. 17, 1968, Ser. No. 768,376
Int. Cl. H02g 9/02
U.S. Cl. 174—38                              10 Claims

ABSTRACT OF THE DISCLOSURE

This specification discloses a pedestal-type telephone cable closure consisting of a base and an upper housing of like cross section. The base is mounted on a channel post which is driven in the ground separated from the base. A front panel fully removable from the base top provides entry to the closure interior to facilitate cable installation. Cables are led in through the base bottom, and splices and service drops are completed with aid of bracketry connected to the base but extending into the upper housing interior.

FIELD OF THE INVENTION

This invention relates to outdoor pedestal type electrical closures, especially those used with buried telephone cable plant.

BACKGROUND OF THE INVENTION

Telephone cable closures are used increasingly at above-ground locations in buried distribution plant to provide ready-access facilities for terminating buried wire and station wire at junctions with buried plastic insulated cable. Such closures typically include a mounting stake, an enclosure through which to lead the cable from the ground, and a space for splicing.

Numerous such pedestal closures are now employed in connection with buried telephone cable plant. None, however, adequately meet all of the needs for pedestal type closures. This lack stems in part from the mechanical configurations used. A prime drawback of present closures, for example, is their structural complexity, which has its cost aspect, and which further makes for an unattractive-looking closure. A more serious problem is the relative inflexibility of present closures to handle both entire cable splices and service drops in the same basic design. This limitation prompts the use of several specialized designs of closures where one should suffice.

An added problem in many existing closures is the manner in which the closure is mounted into the ground. The usual practice is to force the closure base into the soil by pounding. In many present designs, however, the pounding must be applied to the top cover of the closure which, while substantial enough, in time loses its shape. Pounding on the top cover also can dislodge electrical connections within the closure.

A further problem with existing closures is the extra work usually necessary in placing additional service wires, which involves clearing out the bottom ballasting in order to make a path for the wires between the splice bracket and the facility being serviced.

Accordingly, one object of the invention is to house both service and splice facilities conveniently in a single cable closure.

A further object of the invention is to eliminate having to remove the ballasting in the closure base to install added service wires.

A further object of the invention is to stake a closure into the ground without having to pound on the top portion.

A still further object of the invention is to simplify the installation and subsequent use of telephone cable closures.

A still further object of the invention is to improve the interlocking of all closure parts so that an even outer surface is formed to lend a modern appearance to the closure.

SUMMARY OF THE INVENTION

These and other objects are achieved in accordance with the invention by a cable closure consisting of a base with fully closed sides but having a removable front panel, a top cover that engages the base and the panel, and a channel or stake which when driven into the ground supports only the base. The buried cable is looped through the base of the closure. Suitable brackets connected to the top of the base are included for terminating cable pairs. A vertical channel formed in one corner of the base and leading to the base bottom allows underground services wires to enter the bottom of the base and be terminated at the top of the closure without the need for removing ballasting.

The base, panel and top cover are assembled into a uniform cross-sectional closure, owing to the use of flanged offset joints. A die cast outer sheath clamp in conjunction with a standard inner clamp improves sheath continuity and also improves mechanical clamping of the cables for protection against frost movement.

Further objects, features, and advantages of the invention may be apprehended from a reading of the description to follow of an illustrative embodiment thereof.

THE DRAWING

FIG. 1 is an exploded frontal perspective view of an illustrative embodiment of the closure proper;

FIG. 3 is a perspective view of the closure with cables, and showing brackets for mounting cable splices;

FIG. 5 is a frontal perspective of a further type of bracket, mountable on the bracketing shown in FIG. 3.

DETAILED DESCRIPTION OF AN ILLUSTRATIVE EMBODIMENT

Figure 6:
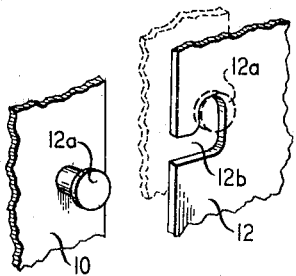
FIG. 6 is a side view showing the base door latching detail.

FIG. 1 shows the closure proper consisting of a 4-sided flush-bottom base 10, an upper housing 11, and a removable front panel 12 which fits on a lip 13 of the base 10. FIG. 6 shows pins 12a of base 10 engaged in slots 12b of panel 12. Housing 11 fits on a lip 14 of base 10 and a lip 12c of panel 12. Housing 11 receives the recessed screw 15 of panel 12 in a threaded key 16 which locks together base 10, housing 11, and panel 12. Base 10, housing 11 and panel 12 are formed as steel sections welded or riveted as shown.

Removable panel 12 is provided to facilitate cable installation. Panel 12 serves as a limited access to the interior of base 10 and also as a means for locking housing 11 onto base 10.

Figure 2:
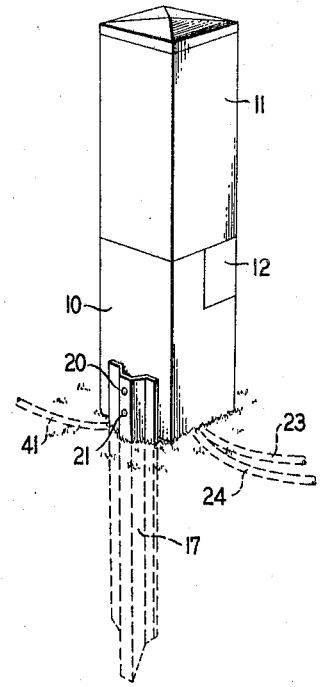
FIG. 2 is a prespective view of a closure in use.

As seen in FIG. 2, base 10 is mounted on a post 17. When so mounted, base 10 extends somewhat below ground level. Base 10 includes two keyhole-shaped holes 18, 19; and post 17 has two locking bolts 20, 21 corresponding to holes 18, 19. Installation involves driving post 17 into the ground by itself, and maneuvering the bolts 20, 21 into the holes 18, 19 until bolts and the keyholes are engaged. The bolts are then taken up to complete the fastening.

Pursuant to one facet of the invention, a channel 22 which advantageously may be L-shaped is fastened as by riveting along the vertical back corner 23 of base 10. The combination of channel 22 and corner 23 provide a run for service wires from the slicing area above base 10 down to the bottom of base 10, as shown in FIG. 1. This run is kept clear of fill or ballast and, accordingly, simplifies running of service wires which are later installed.

The base 10, housing 11, and removable panel 12, when interlocked in place as shown in FIG. 2, com-uniform throughout in cross section. The shape is not only mechanically expendient but aesthetically attractive.

The closure shown in FIG. 2 serves, for example, as a splice point between two cable legs 23, 24 as illustrated in FIG. 3. Cable legs 23, 24 are led from their underground run up through the bottom of base 10 where they are supported in a bracket and clamp assembly 25. Assembly 25 consists of a U-shaped vertical bracket 26 which attaches to the side 10a of base 10, as with rivet 26a. Bracket 26 includes a plurality of spaced slots 27 which adjustably support a bar such as 28. Cable pair 29 are looped over the bar 28, and splices 30 are conventionally effected between the pairs.

Assembly 25 further includes a pair of horizontal slotted arms 31, 32 which attach to the side of 10a of base 10 as with rivets 10b. Arms 31, 32 provide a slide support for a removable U-shaped bracket 33. The latter includes a downwardly depending leg 34 and a separate upwardly depending leg 35. Leg 34 an leg 35 respectively support conventional two-piece outer cable sheath clamps 36a, 36b which are shown gripping the outer jacket 37 of the cable legs 23, 24. An inner sheath clamp (not shown) is electrically and mechanically connected between outer sheath clamps 36a, 36b and the usual metallic inner sheath of each cable leg 23, 24.

The closure illustrated in FIG. 3 supports two cable legs 23, 24; but can also support where necessary a third cable (not shown) by attachment of a sheath clamp such as 36a to a selected slot 27 of one of the legs of U-shaped bracket 26.

Figure 4:
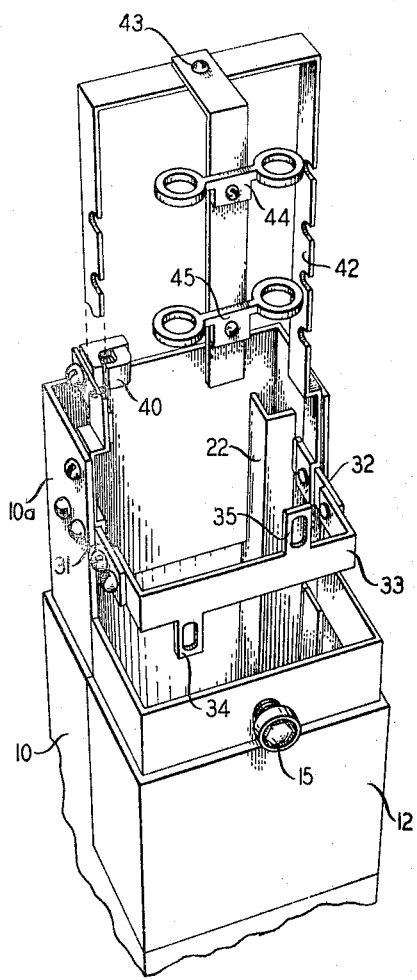
FIG. 4 is a perspective view showing a closure with brackets for splicing service wires to cable pairs.

The embodiment described thus far provide cable splice facilities. When the closure is intended primarily as a service splice point, the bracketing assembly is advantageously substantially as shown in FIG. 4. Service pairs are spliced to appropriate ones of the conductor pairs 29 and led through the run formed by channel 22 down and out through the bottom of base 10, as shown in FIG. 2, and on to the facility being served.

The bracket assembly of FIG. 4 consists of a vertical U-shaped member 42 from the top of which depends a bar 43. Two plastic ring pairs 44, 45 are spacedly mounted on bar 43 to accommodate conductor to service wire splices. The ground lug 40 serves to band the metallic shield of service wire or the armor wire of underground wire to the closure. The U-shaped horizontal bracket 33, its legs 34, 35 and associated stub and clamping elements (not shown) inclusively are advantageously identical to their counterpart structures shown in FIG. 3. Brackets 33 may be removed for work operations during installation.

A variation of the invention involves adding the bracket depicted in FIG. 5 to the bracket structure shown in FIG. 3. FIG. 5 shows a service wire bracket assembly which can be identical with the member 42 shown in FIG. 4, but with the addition of a block 46. The latter is used when conventional voltage and current protection is required at the closure. The combination of brackets just described is used when both a cable splice and a service drop is desired within the same closure. It is necessary to provide an extended housing 11 to accommodate the increased closure height. The closure's overall shape, however, remains substantially as depicted in FIG. 2.

Persons skilled in the art will appreciate certain further advantages to the cable closure of the present invention. It facilitates ready connection of loading coils to a small group of cable pairs within the closure. Also, the closure may be used as an access or control point for dedicated plant. Further, the interlocking parts of the closure provide not only an even outer surface but prevent insects from entering the closure and disrupting work on it later in time.

It is to be understood that the embodiments described herein are merely illustrative of the principles of the invention. Various modifications may be made thereto by persons skilled in the art without departing from the spirit and scope of the invention.

What is claimed is:

1. A pedestal closure for buried telephone cable, comprising in combination:
   a flush-bottom, open-end, four-sided base with an access defined by a cutout of the top of three sides, and including an upward extension of the remaining side;
   an upper housing of like cross section and closed at the top;
   a panel flush mounted with said three sides covering said access and in edge contact with said upper housing;
   first means for affixing said panel to said base; and
   second means for affixing said upper housing to said panel.

2. A closure pursuant to claim 1, wherein said first means comprises a pair of pins extending inwardly from the base sides adjoining said upward extension, and a corresponding pair of slots in the respective panel sides.

3. A closure pursuant to claim 2, wherein said second means comprises a threaded chamber in the front of said upper housing and a bolt for engagement therein fastened to said panel.

4. A pedestal pursuant to claim 1, wherein said base further comprises an inwardly extending horizontal lip for receiving the bottom edges of said panel.

5. A closure pursuant to claim 4, wherein said base and said panel further comprises a common inwardly extending horizontal peripheral lip for receiving the bottom edges of said upper housing.

6. A closure pursuant to claim 1, further comprosing a corner channel running from the level of said panel to said base bottom.

7. A closure pursuant to claim 6, further comprising means for clamping one or more telephone cable sections therein to support said sections vertically.

8. A closure pursuant to claim 7, further comprising means for looping associated conductor pairs of said cable sections to support splices of said pairs in the space above said clamping means.

9. A closure pursuant to claim 8, further comprising means for supporting select ones of said conductor pairs and surface wires running in said corner channel for splicing of said selected pairs and said service wires.

10. A closure pursuant to claim 8, wherein said looping means comprises an inverted U-shaped member connected to a top extension of said base, said member including two vertical legs each with periodic slots therein, and a horizontal bar connected between two opposed ones of said slots, said bar supporting the looped ends of said conductor pairs.

References Cited

UNITED STATES PATENTS

| | | | |
|---|---|---|---|
| 3,164,668 | 1/1965 | Skubal | 174—37 X |
| 3,257,496 | 6/1966 | Hamilton | 174—38 |
| 3,279,838 | 10/1966 | Hamilton | 174—38 X |
| 3,309,456 | 3/1967 | Connell | 174—38 |
| 3,341,744 | 9/1967 | Barwick. | |
| 3,404,212 | 10/1968 | Mack et al. | 174—38 |

LARAMIE E. ASKIN, Primary Examiner

U.S. Cl. X.R.

317—120